(12) United States Patent
Salter et al.

(10) Patent No.: US 12,496,976 B2
(45) Date of Patent: Dec. 16, 2025

(54) CARGO FLOOR

(71) Applicant: Ford Global Technologies, LLC, Dearborn, MI (US)

(72) Inventors: Stuart C. Salter, White Lake, MI (US); Adrian Aguirre, Alvaro Obregon (MX); Micah Jones, Pleasant Ridge, MI (US); Dominic Berlingieri, Washington Township, MI (US); Brendan Diamond, Grosse Pointe, MI (US); Michael John Neville, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 465 days.

(21) Appl. No.: 18/133,067

(22) Filed: Apr. 11, 2023

(65) Prior Publication Data

US 2024/0343199 A1    Oct. 17, 2024

(51) Int. Cl.
*B60R 5/04* (2006.01)
*B60R 11/00* (2006.01)
*B62D 33/00* (2006.01)

(52) U.S. Cl.
CPC ............... *B60R 5/04* (2013.01); *B62D 33/00* (2013.01); *B60R 2011/0057* (2013.01)

(58) Field of Classification Search
CPC .. B60R 5/04; B60R 5/041; B60R 9/06; B60R 9/065; B60R 2011/0084; B60R 2011/0057; B60R 2011/007; B62D 33/00; B62D 33/04; B62D 33/08; B62D 25/20; B62D 25/2054; B60P 3/40; B60P 1/6427

(Continued)

(56) References Cited

U.S. PATENT DOCUMENTS 5,544,998 A * 8/1996 Malinowski ............... B60P 1/00
                                                            414/522
5,944,371 A * 8/1999 Steiner ...................... B60R 5/04
                                                            296/187.11

(Continued)

FOREIGN PATENT DOCUMENTS

DE    102010063819 A1 *  6/2012    ............. B60R 5/041
EP        1736365 A1 * 12/2006    ............. B60R 13/01

OTHER PUBLICATIONS

Translation DE-102010063819-A1.*
Translation EP-1736365-A1.*

*Primary Examiner* — Amy R Weisberg
*Assistant Examiner* — Denise Lynne Esquivel
(74) *Attorney, Agent, or Firm* — Vichit Chea; Price Heneveld LLP (57) ABSTRACT

A cargo floor for a vehicle, the cargo floor including a body and a guiderail coupled with an underside of the body. The cargo floor including a puck coupled with the underside of the body, wherein the at least one puck slidably engages an interior surface of a cargo space. The cargo floor including a cleat defining a lens-shaped profile, the cleat coupled with underside of the body. The cargo floor including a track coupled with the interior surface of the cargo space and aligned with the guiderail. The cleat is slidably coupled with the track, and the body is positioned between a disposed position and an extended position. The cargo floor further includes an actuator coupled with the underside of the body. The actuator locks and unlocks the guiderail and the track.

16 Claims, 7 Drawing Sheets

(58) Field of Classification Search
USPC .... 296/37.1, 37.16, 37.6, 26.08, 26.09, 26.1
See application file for complete search history.

(56) References Cited

U.S. PATENT DOCUMENTS

| | | |
|---|---|---|
| 7,121,603 B2 | 10/2006 | Stevenson et al. |
| 7,125,082 B2 | 10/2006 | Copus |
| 7,188,881 B1 | 3/2007 | Sturt et al. |
| 7,393,036 B2* | 7/2008 | Bastian .................. B60P 1/003 |
| | | 296/26.1 |
| 7,445,263 B1* | 11/2008 | Bluhm .................... B60R 5/041 |
| | | 296/26.09 |
| 9,868,382 B2* | 1/2018 | Aghili ..................... B60R 11/06 |
| 10,059,269 B2* | 8/2018 | Herman .............. B60R 13/0237 |
| 10,391,916 B2 | 8/2019 | Ferkul |
| 2006/0145498 A1* | 7/2006 | Bartos ...................... B60P 3/40 |
| | | 296/26.09 |
| 2014/0265411 A1* | 9/2014 | Thota ...................... B60N 2/36 |
| | | 296/37.16 |
| 2019/0308543 A1* | 10/2019 | Salewski ................ B65G 67/04 |

* cited by examiner

CARGO FLOOR

FIELD OF THE DISCLOSURE

The present disclosure generally relates to a cargo floor, and more particularly relates to a cargo floor that may transition between a disposed position and an extended position.

BACKGROUND OF THE DISCLOSURE

Motor vehicles are commonly equipped with various cargo spaces to allow for objects to be stored in the vehicle. The cargo spaces may be loaded with objects through a variety of openings and conveying devices. It would be desirable to provide for a cargo floor that transitions across non-parallel planes to an extended position for closer loading of objects to be stored in a cargo space.

SUMMARY OF THE DISCLOSURE

According to a first aspect of the present disclosure, a cargo floor for a vehicle, the cargo floor including a body and a guiderail coupled with an underside of the body is provided. The cargo floor also includes a puck coupled with the underside of the body. The at least one puck slidably engages an interior surface of a cargo space. The cargo floor including a cleat defining a lens-shaped profile, the cleat coupled with the underside of the body. The cargo floor further including a track coupled with the interior surface of the cargo space and aligned with the guiderail. The cleat is slidably coupled with the track. The body is positioned between a disposed position and an extended position.

Embodiments of the first aspect of the present disclosure can include any one or a combination of the following features:
- an actuator coupled with the underside of the body, wherein the actuator locks and unlocks the guiderail and the track;
- a handle, a cam coupled with the handle, and a plurality of rods;
- the handle is coupled with the cam via a first rod of the plurality of rods, wherein the handle is movable between a forward position and a rearward position, wherein the first rod is spring-loaded and biases the handle toward an intermediate position between the forward position and the rearward position;
- at least a second rod of the plurality of rods engages the cam when the handle is in the intermediate position, and wherein the second rod is spring-loaded and biased toward the cam;
- the cargo floor further including a plurality of stabilizer brackets coupled with the underside of the body, wherein each stabilizer bracket defines a stabilizing aperture, and wherein at least the first rod and the second rod are disposed in a respective stabilizing aperture of the plurality of stabilizer brackets;
- the track including a front-end bracket and a rear-end bracket, wherein the track defines a groove, and wherein the front-end bracket and the rear-end bracket bound movement of the cleat within the groove;
- the guiderail is at least partially disposed within the groove when the body is the disposed position;
- the at least one puck engages the interior surface of the cargo space on a deployed tailgate in response to the body being positioned in the extended position;
- the interior surface of the cargo space on the deployed tailgate is non-parallel with the interior surface of the cargo space on a vehicle floor; and
- the at least one puck includes a magnet that selectively and magnetically couples with the interior surface.

According to a second aspect of the present disclosure, a cargo floor for a vehicle, the cargo floor including a body having a top side and an underside is provided. The top side is configured to carry a load. The cargo floor including a plurality of guiderails coupled with the underside of the body. The cargo floor includes a plurality of pucks coupled with the underside of the body. The pucks selectively and slidably engage an interior surface of a cargo space. The cargo floor including a plurality of cleats each defining a lens-shaped profile. Each cleat of the plurality of cleats is coupled with the underside of the body and aligned with each guiderail of the plurality of guiderails. Aligned, for the purpose of this disclosure, generally means to substantially share a common plane in space. The cargo floor including a plurality of tracks coupled with the interior surface of the cargo space, each track defining a groove to selectively receive each guiderail of the plurality of guiderails. Each cleat of the plurality of cleats is slidably coupled with each respective track of the plurality of tracks within the groove. The cargo floor including an actuator configured to lock the plurality of guiderails to the respective plurality of tracks. The actuator is configured to unlock the guiderails from the respective plurality of tracks to permit translation of the body.

Embodiments of the second aspect of the present disclosure can include any one or a combination of the following features:
- the plurality of pucks each comprise a magnet that selectively and magnetically couples with the interior surface of the cargo space;
- a lever positionable between an activated state and a deactivated state and a controller communicatively coupled with the lever and the magnet, wherein the magnet magnetically couples with the interior surface in response to the lever being positioned in the activated state;
- the actuator including a handle biased toward an intermediate position, a first spring-loaded rod coupled with the handle, a cam coupled with the first spring-loaded rod, wherein the first spring-loaded rod and the cam move in response to the handle moving; and a second spring-loaded rod selectively engaged with the cam, wherein the second spring-loaded rod unlocks the plurality of guiderails from the plurality of tracks in response to the handle moving.
- the plurality of tracks is coupled with a rear-end bracket, wherein the plurality of tracks is coupled with a front-end bracket, wherein the front-end bracket defines a recessed edge, and wherein the front-end bracket defines a plurality of guide channels;
- the body defines an access recess, and wherein the actuator is accessible through the access recess; and
- the interior surface of the cargo space including at least a first region and a second region non-parallel with the first region, wherein the pucks slidably engage the interior surface of the cargo space on the first region and the second region.

According to a third aspect of the present disclosure, a cargo floor for a vehicle, the cargo floor including a body having a top side and an underside is provided. The body defines an access recess. The body is positioned between an extended position and a disposed position. The cargo floor including a plurality of pucks coupled with the underside of the body. The pucks extend outwardly from the underside. The pucks selectively and slidable engage a plurality of regions on an interior surface of a cargo space. The plurality of pucks includes a magnet to selectively and magnetically couple with the interior surface. The cargo floor including a lever positionable between an activated state and a deactivated state. The cargo floor including a controller communicatively coupled with the lever and the magnet. The magnet magnetically couples with the interior surface in response to the lever being positioned in the activated state. The cargo floor including a first guiderail defining a first aperture, the first guiderail coupled with the underside of the body. The cargo floor including a second guiderail defining a second aperture, the second guiderail coupled with the underside of the body. The cargo floor including a first track defining a first groove and a third aperture, the first track coupled with a first region of the plurality of regions on the interior surface of the cargo space. The cargo floor including a second track defining a second groove and a fourth aperture, the second track coupled with the first region of the plurality of regions on the interior of the cargo space. The first guiderail and the second guiderail are at least partially received within the first groove and the second groove, respectively, when the body is in the disposed position. The cargo floor including a first cleat defining a first lens-shaped profile, the first cleat coupled with the underside of the body. The first cleat is slidably coupled with the first groove. The cargo floor including a second cleat defining a second lens-shaped profile, the second cleat coupled with the underside of the body. The second cleat is slidably coupled with the second groove. The cargo floor including a front-end bracket defining a recessed edge, a first guide channel, and a second guide channel. The frontend bracket is coupled with the first track and the second track. The cargo floor including a rear-end bracket coupled with the first track and the second track. The first cleat and the second cleat are bound between the front-end bracket and the rear-end bracket.

Embodiments of the third aspect of the present disclosure can include the following features:

an actuator coupled with the underside of the body, wherein the actuator includes a handle movable between a forward position and a rearward position, a first spring-loaded rod, wherein the first spring-loaded rod biases the handle toward an intermediate position between the forward and rearward positions, a cam coupled with the first spring-loaded rod, wherein the cam moves in response to the handle moving, a second spring-loaded rod selectively coupled with the first track and the first guiderail within the first aperture and third aperture, respectively, a third spring-loaded rod selectively coupled with the second track and the second guiderail within the second aperture and the fourth aperture, respectively, wherein the second spring-loaded rod and the third spring-loaded rod selectively engage the cam when the handle is in the intermediate position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
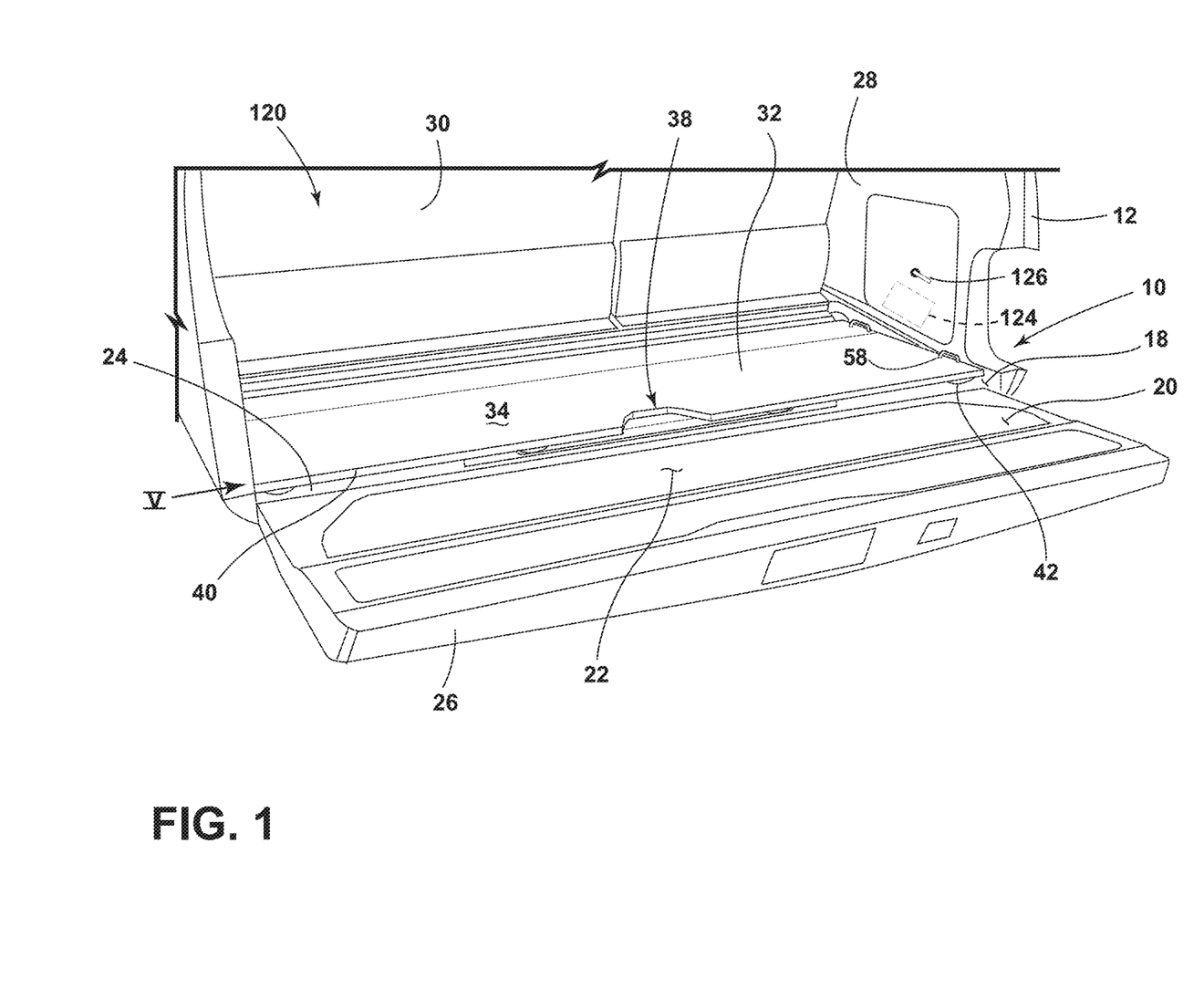
FIG. 1 is a rear perspective view of a cargo floor disposed in a cargo space in a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cargo floor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a cargo floor 10 for a vehicle 12 is positioned at a disposed position V within a cargo space 16 of a vehicle 12 (a trunk, a frunk, or another space within the vehicle 12). The cargo space 16 may include first region 18 and a second region 20. The cargo space 16 may include a plurality of regions comprised of at least the first region 18 and the second region 20. The first region 18 may be on an interior surface 22 of the cargo space 16 on a vehicle floor 24. The second region 20 may be the interior surface 22 of the cargo space 16 on a tailgate 26. Additionally, or alternatively, the first region 18 may be the interior surface 22 on a lateral wall 28 of the cargo space 16. The second region 20 may be the interior surface 22 of the cargo space 16 on a forward wall 30. The cargo floor 10 includes a body 32. The body 32 defines a top side 34 and an underside 36. The underside 36 being opposite of the top side 34. The top side 34 may be configured to carry a load. The body 32 may define an access recess 38. The access recess 38 may be centrally located on a first edge 40 of the body 32. The body 32 may have a width that is substantially similar or less than a width of the cargo space 16. The body 32 may have a length that is substantially similar to or less than a length of the first region 18 of the cargo space 16, the second region 20 of the cargo space 16, and/or a combined length of the first region 18 and the second region 20.

Figure 2A:
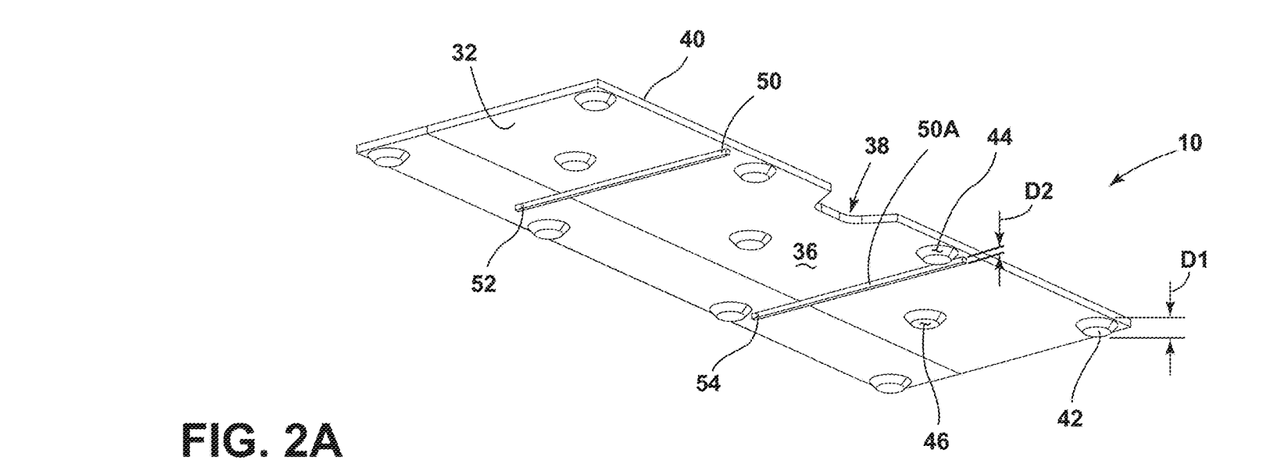
FIG. 2A is a bottom perspective view of the cargo floor having a guiderail.
Figure 2B:
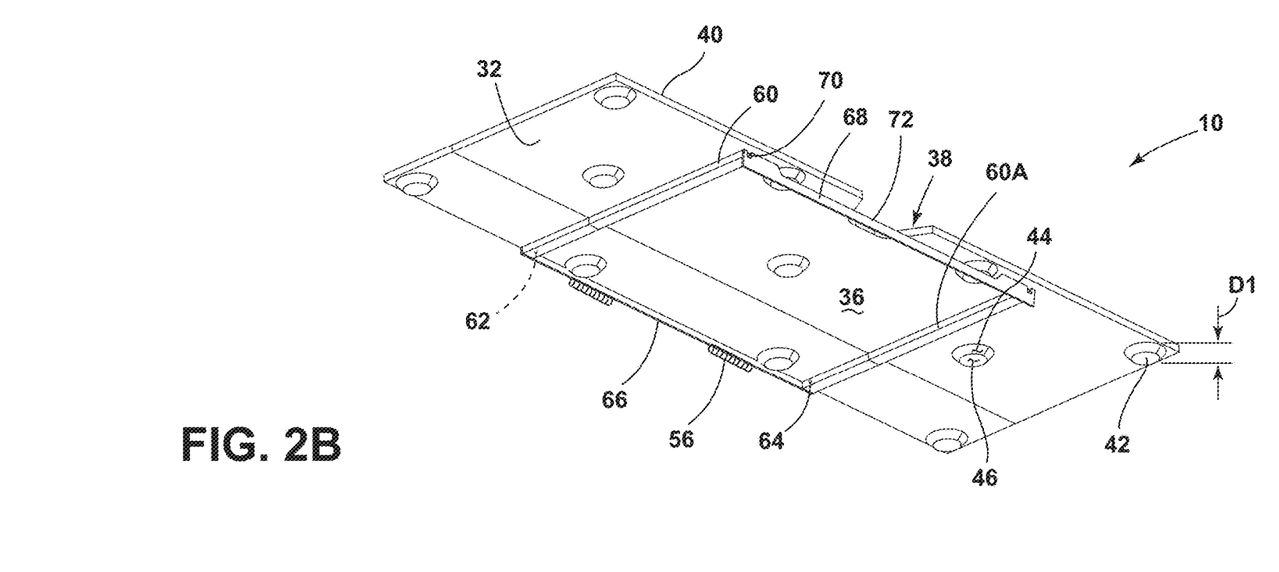
FIG. 2B is a bottom perspective view of the cargo floor having a track.

Referring further to FIGS. 1, 2A and 2B, the cargo floor 10 also includes at least one puck 42. The cargo floor 10 may comprise a plurality of pucks 42. The cargo floor 10 may comprise eleven pucks. The at least one puck 42 may be, for example, a truncated cone, a cylinder, a disc, or another similar shape. The at least one puck 42 is coupled with the underside 36 of the body 32. The at least one puck 42 slidably and selectively engages the interior surface 22 of the cargo space 16. The at least one puck 42 that is a plurality of pucks may be arranged on the underside 36 of the body 32 in a pattern or randomly in the width direction of the body 32 and in the length direction of the body 32. The at least one puck 42 includes a side surface 44 and an engaging surface 46. The at least one puck 42 may be comprised of a first material and a second material. The engaging surface 46 may be comprised of the first material. The side surface 44 may be comprised of the second material. The first material may have a coefficient of friction that is different from the second material. Alternatively, the first material and the second material may have the same or similar coefficients of friction. The first material and the second material may be made from a combination of compression molded polytetrafluoroethylene (PTFE) and/or another similar polymeric material (e.g., fiberglass, talc, polypropylene, or more).

With further reference to FIG. 1 an anchor pin 58 may be coupled with the top side 34 of the body 32. The anchor pin 58 is configured to selectively couple to tying means (e.g., tie-downs, straps, or other similar means) to tie a loaded object to the body 32 of the cargo floor 10.

With even further reference to FIG. 1, the cargo floor 10 includes a lever 126 and a controller 124. The lever 126 is positioned between an activated state and a deactivated state. The lever 126 may transition between the activated state and the deactivated state via a direct user, an automation, or electrical actuation. The lever 126 is the activated state signals the controller 124. The controller 124 in response to being signaled by the lever 126, controls the magnet shown in FIG. 2C and detailed further below.

With further reference to FIGS. 2A and 2B, the cargo floor 10 for a vehicle 12 also includes a guiderail 50. The cargo floor 10 may include a second guiderail 50A. Additionally, or alternatively, the cargo floor 10 may include a plurality of guiderails 50. The guiderail 50 is coupled with the underside 36 of the body 32. The guiderail 50 extends the length of the body 32. Additionally, or alternatively, the guiderail 50 may extend a distance less than the length of the body 32. The at least one puck 42 extends outwardly from the underside 36 of the body 32 a first depth D1. The guiderail 50 extends outwardly from the underside 36 of the body 32 a second depth D2. The first depth D1 is greater than the second depth D2. The guiderail 50 (or first guiderail) defines a first aperture 52. The second guiderail 50A defines a second aperture 54. The first aperture 52 and the second aperture 54 may be defined respectively within the first guiderail 50 and second guiderail 50A distal the first edge 40 of the body 32. The guiderail 50 may be substantially prismatic, as depicted, or the guiderail 50 may be substantially cylindrical.

With even further reference to FIGS. 2A and 2B, the cargo floor 10 also includes a track 60. The cargo floor 10 may include a second track 60A. Additionally, or alternatively, the cargo floor 10 may include a plurality of tracks 60. The track 60 extends the length of the body 32. Additionally, or alternatively, the track 60 may extend a distance less than the length of the body 32. The guiderail 50 is aligned with the track 60. The track 60 may have a width that is greater than a width of the guiderail 50. The track 60 is coupled with the interior surface 22 of the cargo space 16. The cargo floor 10 includes a rear-end bracket 66 and a front-end bracket 68. The track 60 is coupled with the rear-end bracket 66 and the front-end bracket 68 between the rear-end bracket 66 and the front-end bracket 68. The front-end bracket 68 defines a guide channel 70 and a recessed edge 72. The guide channel 70 is configured to selectively receive and slidably engage the guiderail 50. The recessed edge 72 is spaced from the underside 36 of the body 32 a distance greater than the first depth D1. The track 60 (or first track) defines a third aperture 62. The second track 60A defines a fourth aperture 64. The third aperture 62 and the fourth aperture 64 may be defined respectively within the first track 60 and second track 60A proximal the rear-end bracket 66 and distal the front-end bracket 68. When the body 32 is positioned at the disposed position, the first aperture 52 of the first guiderail 50 is aligned with the third aperture 62 of the first track 60. When the body 32 is positioned at the disposed position, the second aperture 54 of the second guiderail 50A is aligned with the fourth aperture 64 of the second track 60A.

With further reference to FIG. 2B, the cargo floor 10 includes a hinge 56. The hinge 56, as shown is coupled with the rear-end bracket 66. Additionally, or alternatively, the hinge 56 may be directly coupled with the body 32 of the cargo floor 10. The hinge 56 is also coupled with the vehicle floor 24 (not shown) such that the cargo floor 10 may be tilted/rotated about the hinge 56 so that an area underneath the cargo floor 10 becomes accessible.

Figure 2C:
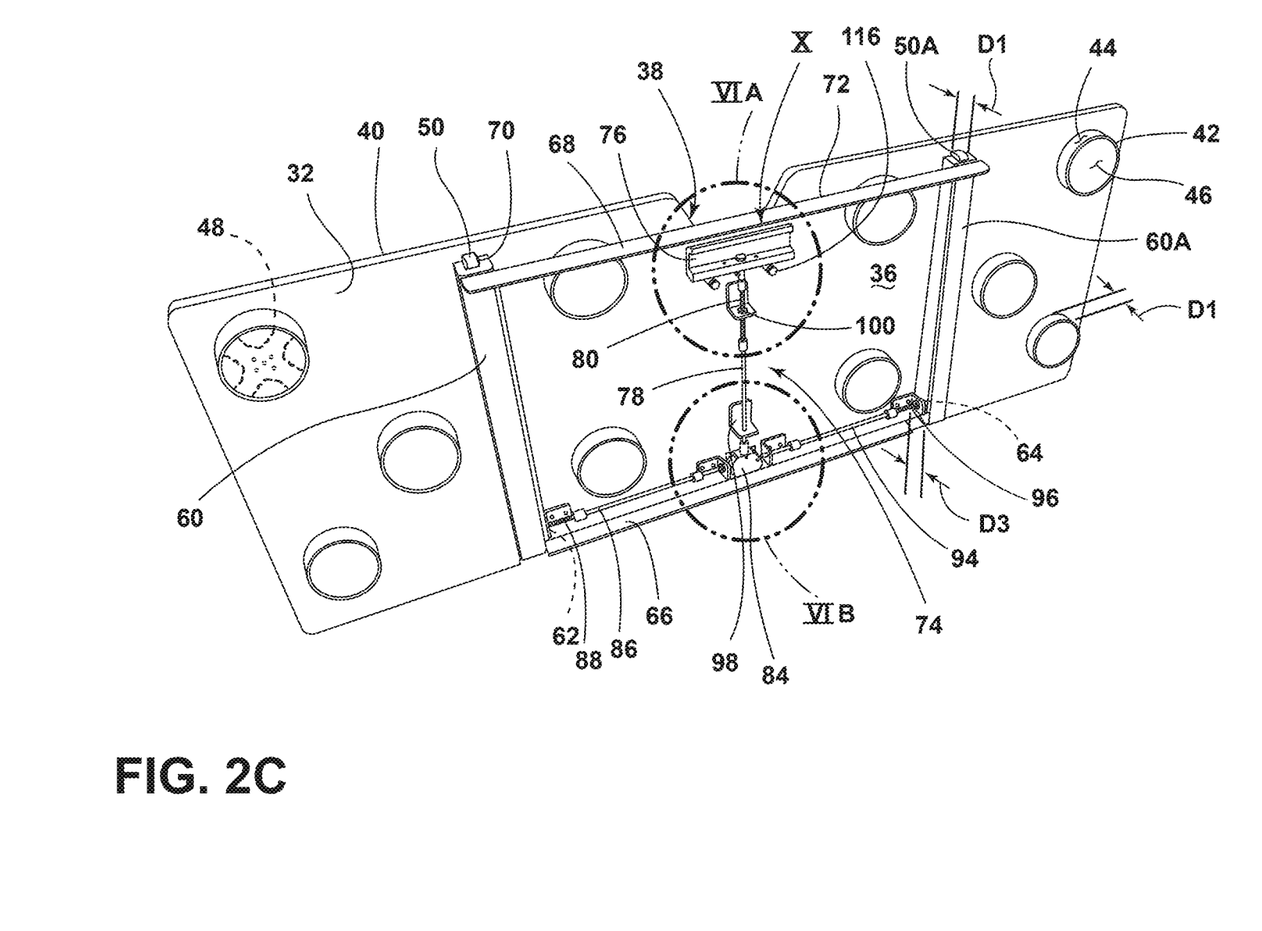
FIG. 2C is a bottom perspective view of the cargo floor having an actuator.

Referring now to FIG. 2C, the cargo floor includes an actuator 74. The actuator 74 extends a third depth D3 away from the underside 36 of the body 32. The first depth D1 is greater than the third depth D3. The actuator 74 includes a handle 76. The handle 76 may be accessed through at least one of the access recess 38 and the recessed edge 72. The actuator 74 also includes a first spring-loaded rod 78 coupled with the handle 76. The first spring-loaded rod 78 may be referred to as a first rod. The first spring-loaded rod 78 includes a first spring 80. The first spring 80 biases the first spring-loaded rod 78 and handle 76 toward an intermediate position X. The actuator 74 includes a cam 84 coupled with the first spring-loaded rod 78. The cam 84 is spaced from the handle 76 by the first spring-loaded rod 78. Additionally, the first spring 80 biases the cam 84 toward the intermediate position X.

With further reference to FIG. 2C, the actuator 74 includes a second spring-loaded rod 86. The second spring-loaded rod 86 includes a second spring 88 that biases the second spring-loaded rod 86 toward the cam 84. The cam 84 defines a round surface 90 that includes an apex 92. In response to the handle 76, the first spring-loaded rod 78, and the cam 84 being in the intermediate position X, the second spring-loaded rod 86 engages the apex 92 of the round surface 90 of the cam 84. In response to the cam 84 being translated toward the intermediate position X, the cam 84 biases the second spring-loaded rod 86. When the body 32 is at the disposed position V and the cam 84 is translated toward the intermediate position X, the cam 84 biases the second spring-loaded rod 86 such that the second spring-loaded rod 86 translates away from the cam 84 and toward a pair of apertures chosen from the first aperture 52 and the third aperture 62 or the second aperture 54 and the fourth aperture 64 of the first guiderail 50 and the first track 60, or the second guiderail 50A and the second track 60A, respectively.

As shown in FIG. 2C, the actuator 74 may include a third spring-loaded rod 94. The first spring-loaded rod 78, the second spring-loaded rod 86, and the third spring-loaded rod 94 may be referred to as a plurality of rods. The third spring-loaded rod 94 includes a third spring 96 that biases the third spring-loaded rod 94 toward the cam 84. In response to the handle 76, the first spring-loaded rod 78, and the cam 84 being in the intermediate position X, the third spring-loaded rod 94 engages a second apex 92A of the round surface 90 of the cam 84. In response to the cam 84 being translated toward the intermediate position X, the cam 84 biases the third spring-loaded rod 94. When the body 32 is at the disposed position V and the cam 84 is translated toward the intermediate position X, the cam 84 biases the third spring-loaded rod 94 such that the third spring-loaded rod 94 translates away from the cam 84 and toward the other pair of apertures chosen from the first aperture 52 and the third aperture 62 or the second aperture 54 and the fourth aperture 64 of the first guiderail 50 and the first track 60, or the second guiderail 50A and the second track 60A, respectively. The second spring-loaded rod 86 and/or the third spring-loaded rod 94 that penetrate the first aperture 52 and the third aperture 62 and/or the second aperture 54 and the fourth aperture 64 lock the first guiderail 50 to the first track 60 and/or the second guiderail 50A to the second track 60A. Additionally, or alternatively, the first guiderail 50, the second guiderail 50A, the first track 60, and the second track 60A may each define a plurality of respective apertures such that the second-spring loaded rod 86 and the third spring-loaded rod 94 may penetrate respective apertures of the guiderail 50 and the track 60 to lock and unlock the guiderail 50 and the track 60 at varying locations between the first region 18 and the second region 20.

With further reference to FIG. 2C, the cargo floor includes a stabilizer bracket 98. The cargo floor may include a plurality of stabilizer brackets 98. The stabilizer bracket 98 is coupled with the underside 36 of the body 32. The stabilizer bracket 98 defines a stabilizing aperture 100. The stabilizing aperture 100 of the stabilizer bracket 98 is configured to receive the first spring-loaded rod 78. Additionally, or alternatively, the stabilizing aperture 100 is configured to receive the second spring-loaded rod 86.

Additionally, or alternatively, the stabilizing aperture 100 is configured to receive additional spring-loaded rods including the third spring-loaded rod 94.

With even further reference to FIG. 2C, the at least one puck 42 include a magnet 48. The magnet 48 is communicatively coupled with the controller 124 shown in FIG. 1. The lever 126, shown in FIG. 1, that is positioned in the activated state ultimately results in the magnet 48 being magnetically coupling to the interior surface 22, preferably the vehicle floor 24. The vehicle floor 24, shown in FIGS. 1 and 3A-4C, is a sheet metal material attracted by magnetism. In response to the lever 126 being positioned in the activated state, the lever 126 signals the controller 124. The controller 124, in response to receiving the signal from the lever 126, controls the magnet 48 of the at least one puck 42 to magnetically coupled the at least one puck 42 with the vehicle floor 24. The at least one puck 42 includes the magnet 48. Additionally, or alternatively, the plurality of pucks 42 may contain the magnet 48. Additionally, or alternatively, the magnet 48 may magnetically couple with the first region 18, the second region 20, and a combination thereof. The magnet 48 may be an electromagnet controlled by the controller such that an electrical signal allows the magnet 48 to couple with the vehicle floor 24. Additionally, or alternatively, the magnet 48 may be a permanent magnet that is moved toward and away from the vehicle floor 24 that is sheet metal. In this example, the magnet 48 would magnetically couple with the vehicle floor 24 when the magnet 48 is moved closer to the vehicle floor 24 by the controller 124 in response to the lever 126 being positioned to the activated state.

Figure 3A:
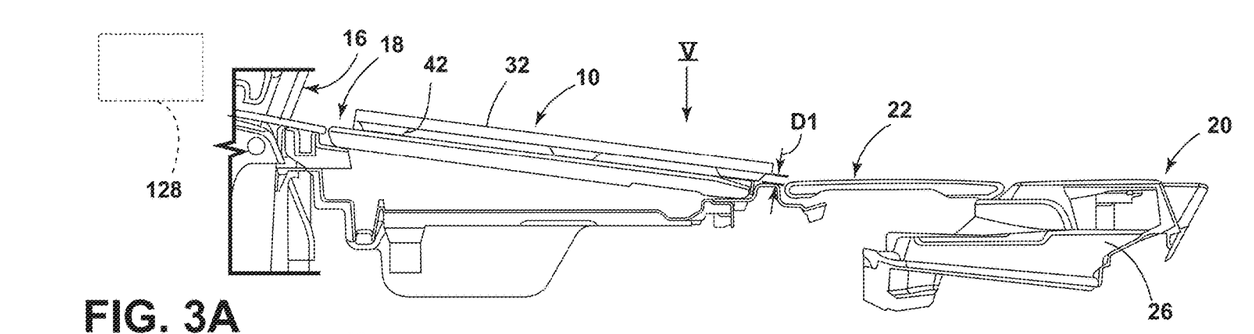
FIG. 3A is a side perspective view of the cargo floor in the disposed position on a first region.

With reference to FIG. 3A, the body 32 is at the disposed position V. The body 32 of the cargo floor 10 is positioned on the interior surface 22 of the cargo space 16 in the first region 18 which may be on the vehicle floor 24 of the vehicle 12. The at least one puck 42, as described above, is slidably engaged with the first region 18 of the interior 120 of the cargo space 16.

Figure 3B:
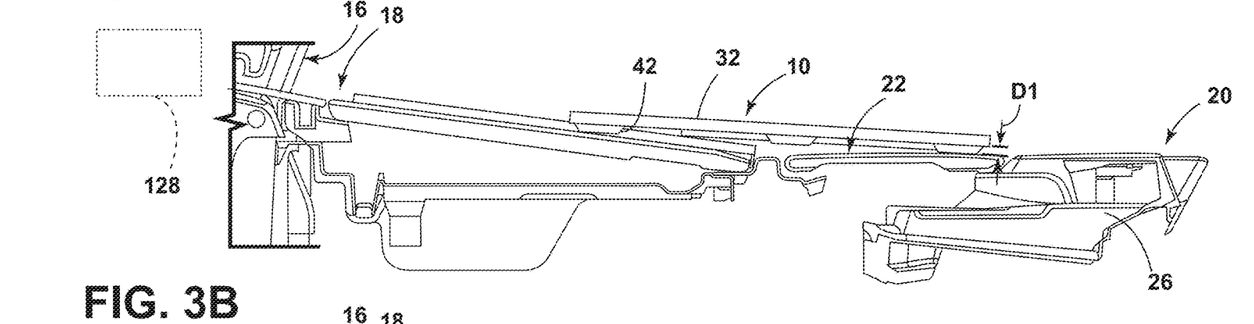
FIG. 3B is a side perspective view of the cargo floor in between the disposed position and an extended position between the first region and a non-parallel second region.

With reference to FIG. 3B, the body 32, of the cargo floor 10 is between the disposed position V and an extended position VI. The at least one puck 42 is slidably engaged with the first region 18 and the second region 20 of the interior surface 22 of the cargo space 16. The second region 20, as shown, may be on the interior surface 22 of the tailgate 26 that is deployed. The first region 18, as shown, may be non-parallel with the second region 20 such that the at least one puck 42 of the plurality of pucks is selectively engaged with the interior surface 22 of the first region 18 and second region 20.

Figure 3C:
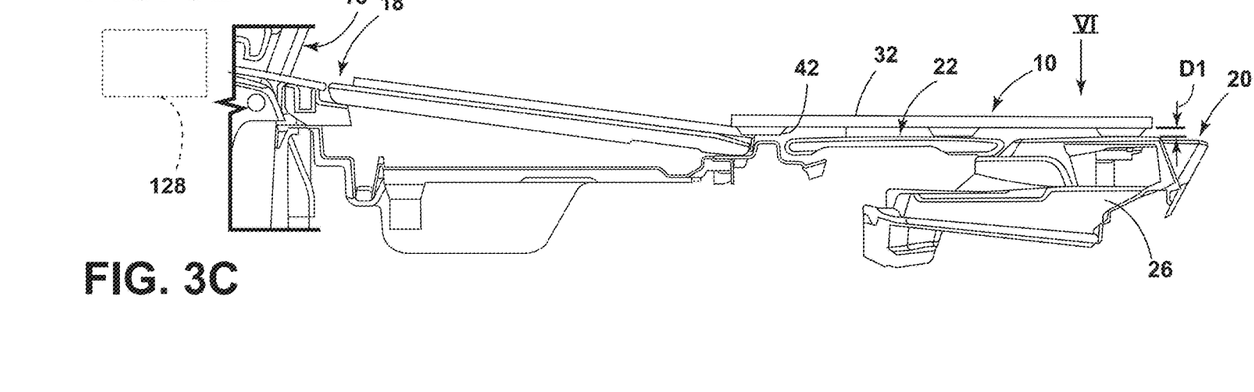
FIG. 3C is a side perspective view of the cargo floor in an extended position on the non-parallel second region.

With reference to FIG. 3C, the body 32, of the cargo floor 10 is at the extended position VI. The at least one puck 42 is slidably engaged with the second region 20 of the interior surface 22 of the cargo space 16. The second region 20, as shown, may be on the interior surface 22 of the tailgate 26 that is deployed.

Figure 4A:
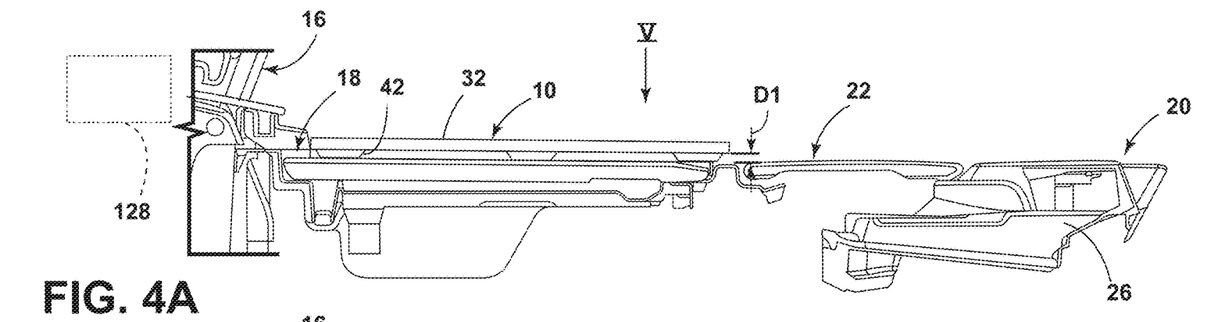
FIG. 4A is a side perspective view of the cargo floor in the disposed position on the first region.
Figure 4B:
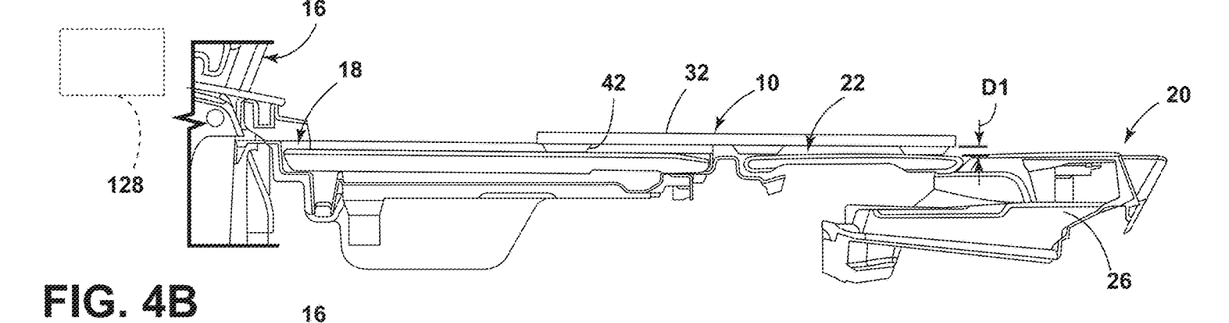
FIG. 4B is a side perspective view of the cargo floor in between the disposed position and the extended position between the first region and the second region.
Figure 4C:
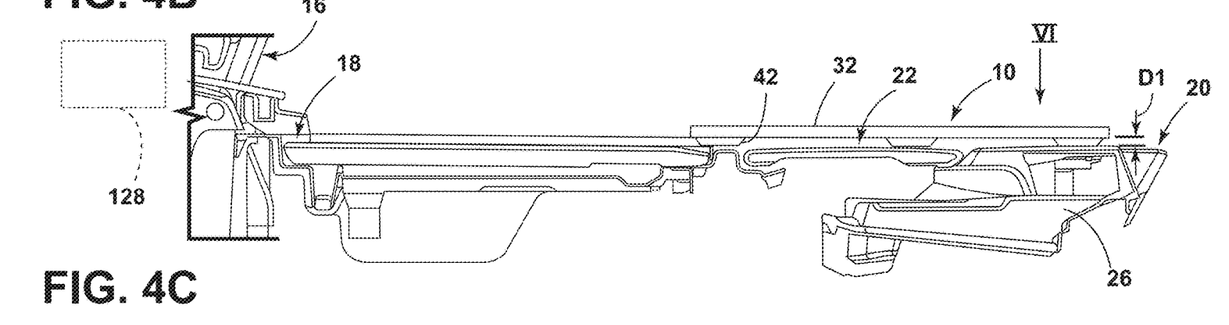
FIG. 4C is a side perspective view of the cargo floor in the extended position.

With further reference to FIGS. 3A-3C, as well as FIGS. 4A-4C, the cargo floor 10 may include a motor 128. The motor 128 may be an electric motor. The motor 128 is configured to translate the body 32 toward and away from the rear-end bracket 66, shown in FIG. 2C. The motor 128 may actuate, for example, wheels, a pulley, a drive shaft, a hydraulic, or other similar means.

With reference to FIG. 4A, the body 32 is at the disposed position V. The body 32 of the cargo floor 10 is positioned on the interior surface 22 of the cargo space 16 in the first region 18 which may be on the vehicle floor 24 of the vehicle 12. The at least one puck 42, as described above, is slidably engaged with the first region 18 of the interior 120 of the cargo space 16.

With reference to FIG. 4B, the body 32, of the cargo floor 10 is between the disposed position V and the extended position VI. The at least one puck 42 is slidably engaged with the first region 18 and the second region 20 of the interior surface 22 of the cargo space 16. The second region 20, as shown, may be on the interior surface 22 of the tailgate 26 that is deployed. The first region 18, as shown, may be substantially planar with the second region 20 such that the at least one puck 42 of the plurality of pucks is selectively engaged with the interior surface 22 of the first region 18 and second region 20 as the guiderail 50 is substantially planar with the track 60.

With reference to FIG. 4C, the body 32, of the cargo floor 10 is at the extended position VI. The at least one puck 42 is slidably engaged with the second region 20 of the interior surface 22 of the cargo space 16. The second region 20, as shown, may be on the interior surface 22 of the tailgate 26 that is deployed.

Figure 5:
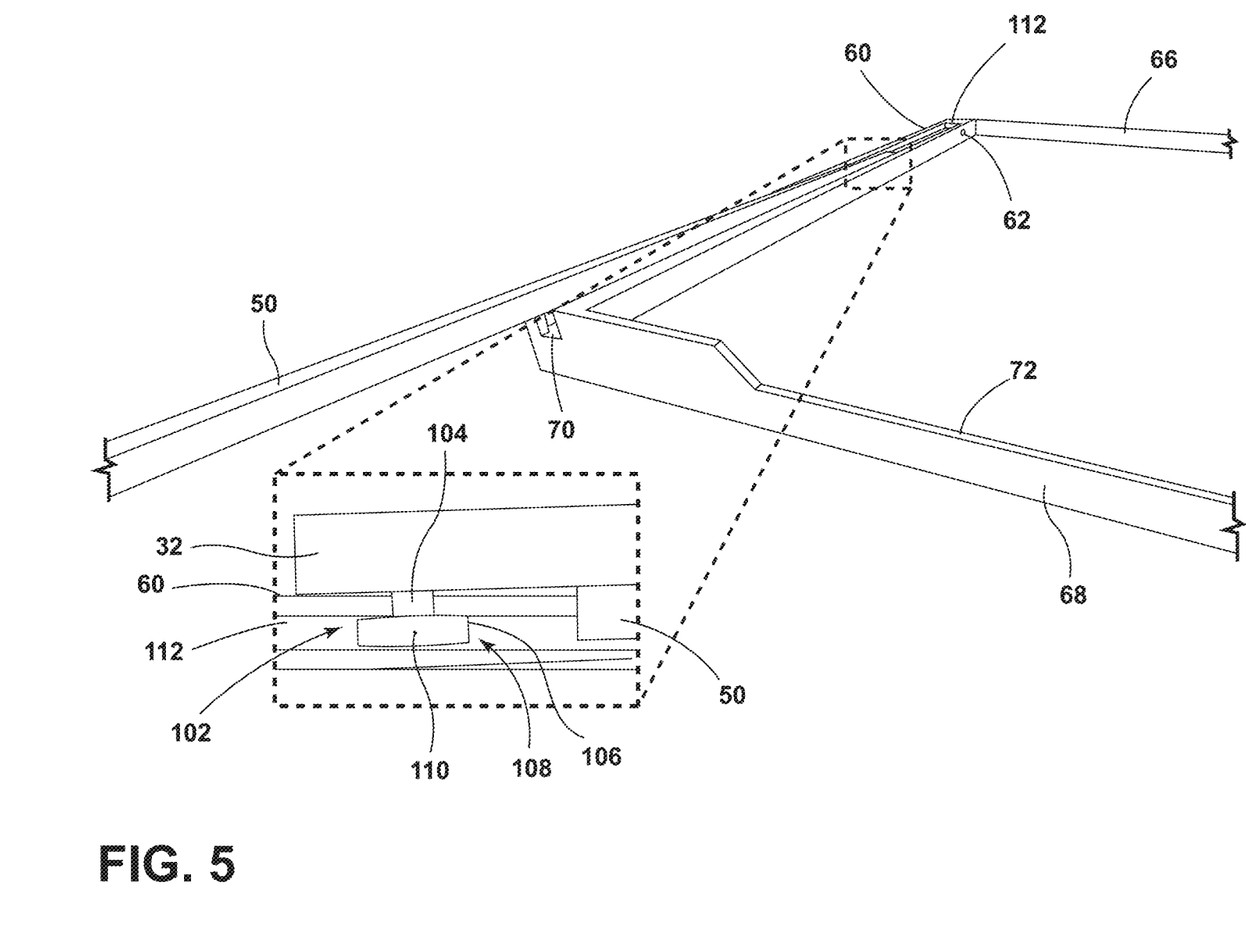
FIG. 5 is top perspective view of the guiderail and a cleat partially disposed in the track.

With reference to FIG. 5, the cargo floor includes a cleat 102. The cargo floor 10 may include a second cleat 102. Additionally, or alternatively, the cargo floor 10 may include a plurality of cleats 102. The cleat 102 includes a column 104 and a footing 106. The footing 106 defines a lens-shaped profile 108. The lens-shaped profile 108 may be a truncated lens shape, as shown. Additionally, or alternatively, the lens-shaped profile 108 may be substantially elliptical, substantially circular, or shaped such that convex curved sides of the lens-shaped profile 108 intersect. The body 32 of the cargo floor 10 is rotatable about a geometric center point 110 of the footing 106 of the cleat 102. The cleat 102 may be coupled with the underside 36 of the body 32 aligned with guiderail 50 such that the guiderail 50 is between the cleat 102 and the first edge 40 of the body 32.

With further reference to FIG. 5, the track 60 defines a groove 112. The cleat 102 is slidably coupled with the track 60 within the groove 112. The cleat 102 is bound between the front-end bracket 68, the rear-end bracket 66, and the groove 112 of the track 60. The groove 112 is configured to at least partially receive the guiderail 50 when the body 32 is in the disposed position V and transitioning toward the extended position VI.

Figure 6A:
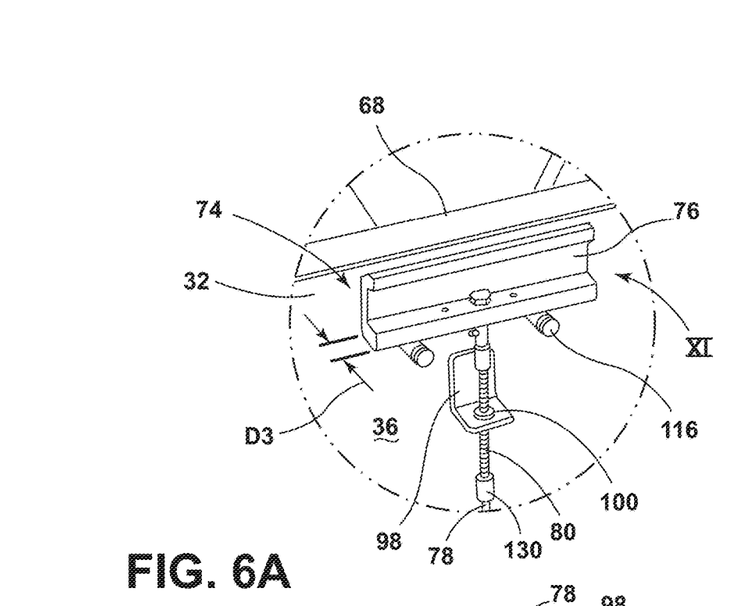
FIG. 6A is a view of portion VIA from FIG. 2C with a handle in a rearward position.
Figure 6B:
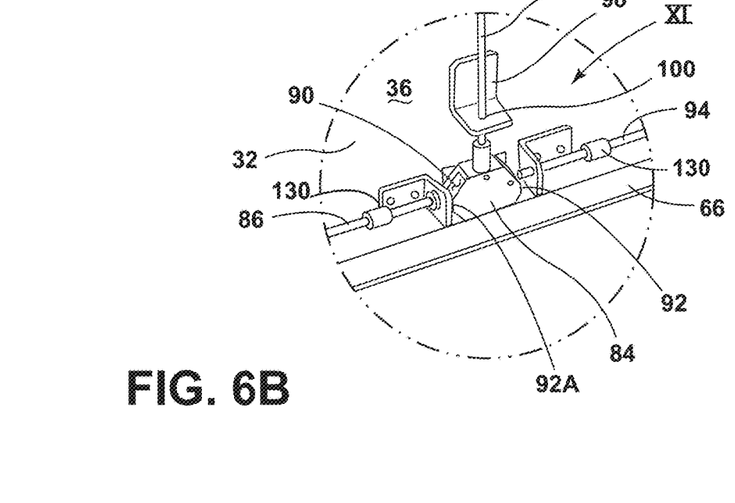
FIG. 6B is a view of portion VIB from FIG. 2C with a cam in a rearward position.

With reference to FIGS. 6A and 6B, the handle 76, and thus the first spring-loaded rod 78 and the cam 84, is movable from the intermediate position X to a rearward position XI toward the rear-end bracket 66. The second spring-loaded rod 86 and the third spring-loaded rod 94 extend outwardly from the first track 60 and the second track 60A, respectively, and selectively disengage the cam 84 in response to the handle 76 moving to the rearward position XI.

Figure 6C:
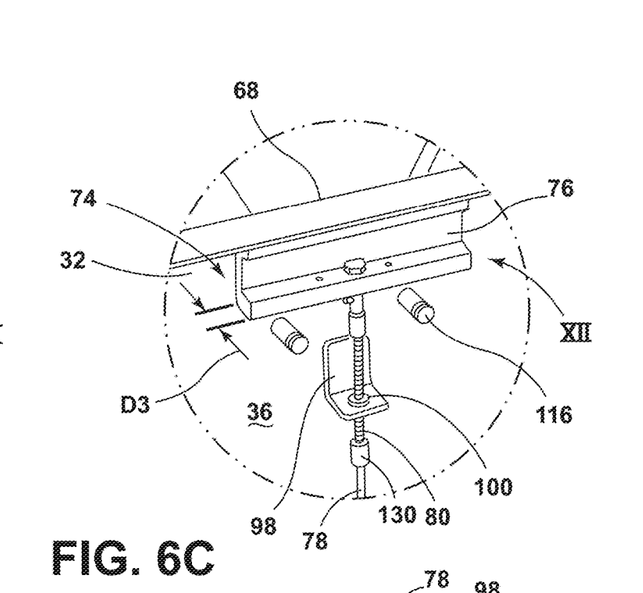
FIG. 6C is a view of the handle in a forward position.
Figure 6D:
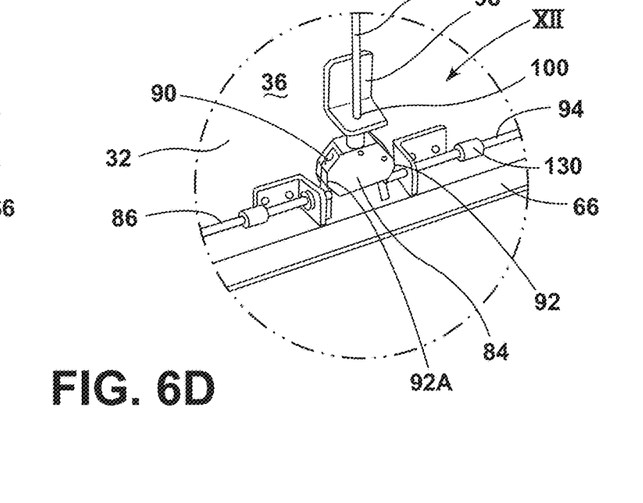
FIG. 6D is a view of the cam in a forward position.

With reference to FIGS. 6C and 6D, the handle 76, and thus the first spring-loaded rod 78 and the cam 84, is movable from the intermediate position X to a forward position XII toward the front-end bracket 68. The second spring-loaded rod 86 and the third spring-loaded rod 94 extend outwardly from the first track 60 and the second track 60A, respectively, and selectively unengaged the cam 84 in response to the handle 76 moving to the forward position XII. The handle 76 may be bound between the front-end bracket and a stopper pin 116 coupled with the underside 36 of the body 32. The handle 76, the first spring-loaded rod 78, the second spring-loaded rod 86, and the third spring-loaded rod 94 may each be coupled with an electric actuator 130. The electric actuator 130 is communicatively coupled with the controller 124, shown in FIG. 1, such that the actuator 74 locks and unlocks the guiderail 50 from the track 60 in response to at least one of a direct movement from a user and the electric actuator 130.

Accordingly, the cargo floor advantageously provides for a surface to load and unloaded stored objects of varying weight. The loading and unloading of the various objects can occur when the body is in the extended position providing for a less distant reach. The handle provides for a simple transition between locking the cargo floor in the disposed position and unlocking the cargo floor to bring the cargo floor into the extended position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A cargo floor for a vehicle, the cargo floor comprising:
a body;
a guiderail coupled with an underside of the body;
at least one puck coupled with the underside of the body, wherein the at least one puck slidably engages an interior surface of a cargo space;
a cleat defining a lens-shaped profile, the cleat coupled with the underside of the body;
a track coupled with the interior surface of the cargo space and aligned with the guiderail, wherein the cleat is slidably coupled with the track, and wherein the body is positioned between a disposed position and an extended position; and
an actuator coupled with the underside of the body, wherein the actuator locks and unlocks the guiderail and the track, and wherein the actuator comprises:
a handle, wherein the handle is coupled with the cam via a first rod of the plurality of rods, wherein the handle is movable between a forward position and a rearward position, and wherein the first rod is spring-loaded and biases the handle toward an intermediate position between the forward position and the rearward position;
a cam coupled with the handle; and
a plurality of rods.

2. The cargo floor of claim 1, wherein at least a second rod of the plurality of rods engages the cam when the handle is in the intermediate position, and wherein the second rod is spring-loaded and biased toward the cam.

3. The cargo floor of claim 2, wherein the cargo floor further comprises a plurality of stabilizer brackets coupled with the underside of the body, wherein each stabilizer bracket defines a stabilizing aperture, and wherein at least the first rod and the second rod are disposed in the stabilizing aperture respective of the plurality of stabilizer brackets.

4. A cargo floor for a vehicle, the cargo floor comprising:
a body;
a guiderail coupled with an underside of the body;
at least one puck coupled with the underside of the body, wherein the at least one puck slidably engages an interior surface of a cargo space;
a cleat defining a lens-shaped profile, the cleat coupled with the underside of the body; and
a track coupled with the interior surface of the cargo space and aligned with the guiderail, wherein the cleat is slidably coupled with the track, wherein the body is positioned between a disposed position and an extended position, wherein the track comprises a front-end bracket and a rear-end bracket, and wherein the track defines a groove, and wherein the front-end bracket and the rear-end bracket bound movement of the cleat within the groove.

5. The cargo floor of claim 4, wherein the guiderail is at least partially disposed within the groove when the body is the disposed position.

6. The cargo floor of claim 5, wherein the at least one puck engages the interior surface of the cargo space on a deployed tailgate in response to the body being positioned in the extended position.

7. The cargo floor of claim 6, wherein the interior surface of the cargo space on the deployed tailgate is non-parallel with the interior surface of the cargo space on a vehicle floor.

8. A cargo floor for a vehicle, the cargo floor comprising:
a body;
a guiderail coupled with an underside of the body;
at least one puck coupled with the underside of the body, wherein the at least one puck slidably engages an interior surface of a cargo space, and wherein the at least one puck includes a magnet that selectively and magnetically couples with the interior surface;
a cleat defining a lens-shaped profile, the cleat coupled with the underside of the body; and
a track coupled with the interior surface of the cargo space and aligned with the guiderail, wherein the cleat is slidably coupled with the track, and wherein the body is positioned between a disposed position and an extended position.

9. A cargo floor for a vehicle, the cargo floor comprising:
a body having a top side and an underside, wherein the top side is configured to carry a load;
a plurality of guiderails coupled with the underside of the body;
a plurality of pucks coupled with the underside of the body, wherein the pucks selectively and slidably engage an interior surface of a cargo space, wherein the interior surface of the cargo space comprises at least a first region and a second region non-parallel with the first region, and wherein the plurality of pucks slidably engage the interior surface of the cargo space on the first region and the second region;
a plurality of cleats each defining a lens-shaped profile, wherein each cleat of the plurality of cleats is coupled with the underside of the body and aligned with each guiderail of the plurality of guiderails;
a plurality of tracks coupled with the interior surface of the cargo space, each track defining a groove to selectively receive each guiderail of the plurality of guiderails, wherein each cleat of the plurality of cleats is slidably coupled with each track of the plurality of tracks, respectively, within the groove; and
an actuator configured to lock the plurality of guiderails to the respective plurality of tracks, and wherein the actuator is configured to unlock the guiderails from the plurality of tracks, respectively, to permit translation of the body.

10. The cargo floor of claim 9, wherein the plurality of pucks each comprise a magnet that selectively and magnetically couples with the interior surface of the cargo space.

11. The cargo floor of claim 10, further comprising:
a lever positionable between an activated state and a deactivated state;
a controller communicatively coupled with the lever and the magnet, wherein the magnet magnetically couples with the interior surface in response to the lever being positioned in the activated state.

12. The cargo floor of claim 9, wherein the actuator comprises:
- a handle biased toward an intermediate position;
- a first spring-loaded rod coupled with the handle;
- a cam coupled with the first spring-loaded rod, wherein the first spring-loaded rod and the cam move in response to the handle moving; and
- a second spring-loaded rod selectively engaged with the cam, wherein the second spring-loaded rod unlocks the plurality of guiderails from the plurality of tracks in response to the handle moving.

13. The cargo floor of claim 9, wherein the plurality of tracks is coupled with a rear-end bracket, wherein the plurality of tracks is coupled with a front-end bracket, wherein the front-end bracket defines a recessed edge, and wherein the front-end bracket defines a plurality of guide channels.

14. The cargo floor of claim 9, wherein the body defines an access recess, and wherein the actuator is accessible through the access recess.

15. A cargo floor for a vehicle, the cargo floor comprising:
- a body having a top side and an underside, wherein the body defines an access recess, and wherein the body is positioned between an extended position and a disposed position;
- an anchor pin coupled with the top side of the body;
- a plurality of pucks coupled with the underside of the body, wherein the pucks extend outwardly from the underside and wherein the pucks selectively and slidable engage a plurality of regions on an interior surface of a cargo space, and wherein the plurality of pucks include a magnet to selectively and magnetically couple with the interior surface;
- a lever positionable between an activated state and a deactivated state;
- a controller communicatively coupled with the lever and the magnet, wherein the magnet magnetically couples with the interior surface in response to the lever being positioned in the activated state;
- a first guiderail defining a first aperture, the first guiderail coupled with the underside of the body;
- a second guiderail defining a second aperture, the second guiderail coupled with the underside of the body;
- a first track defining a first groove and a third aperture, the first track coupled with a first region of the plurality of regions on the interior surface of the cargo space;
- a second track defining a second groove and a fourth aperture, the second track coupled with the first region of the plurality of regions on the interior of the cargo space, wherein the first guiderail and the second guiderail are at least partially received within the first groove and the second groove, respectively, when the body is in the disposed position;
- a first cleat defining a first lens-shaped profile, the first cleat coupled with the underside of the body, and wherein the first cleat is slidably coupled with the first groove;
- a second cleat defining a second lens-shaped profile, the second cleat coupled with the underside of the body, and wherein the second cleat is slidably coupled with the second groove;
- a front-end bracket defining a recessed edge, a first guide channel, and a second guide channel, wherein the front-end bracket is coupled with the first track and the second track; and
- a rear-end bracket coupled with the first track and the second track, wherein the first cleat and the second cleat are bound between the front-end bracket and the rear-end bracket.

16. The cargo floor of claim 15 further comprising:
- an actuator coupled with the underside of the body, wherein the actuator comprises:
  - a handle movable between a forward position and a rearward position;
  - a first spring-loaded rod, wherein the first spring-loaded rod biases the handle toward an intermediate position between the forward and rearward positions;
  - a cam coupled with the first spring-loaded rod, wherein the cam moves in response to the handle moving;
  - a second spring-loaded rod selectively coupled with the first track and the first guiderail within the first aperture and the third aperture, respectively; and
  - a third spring-loaded rod selectively coupled with the second track and the second guiderail within the second aperture and the fourth aperture, respectively, wherein the second spring-loaded rod and the third spring-loaded rod selectively engage the cam when the handle is in the intermediate position.

* * * * *